The present invention relates to improvements in the production of optical and ophthalmic lenses from transparent thermosettable resins.

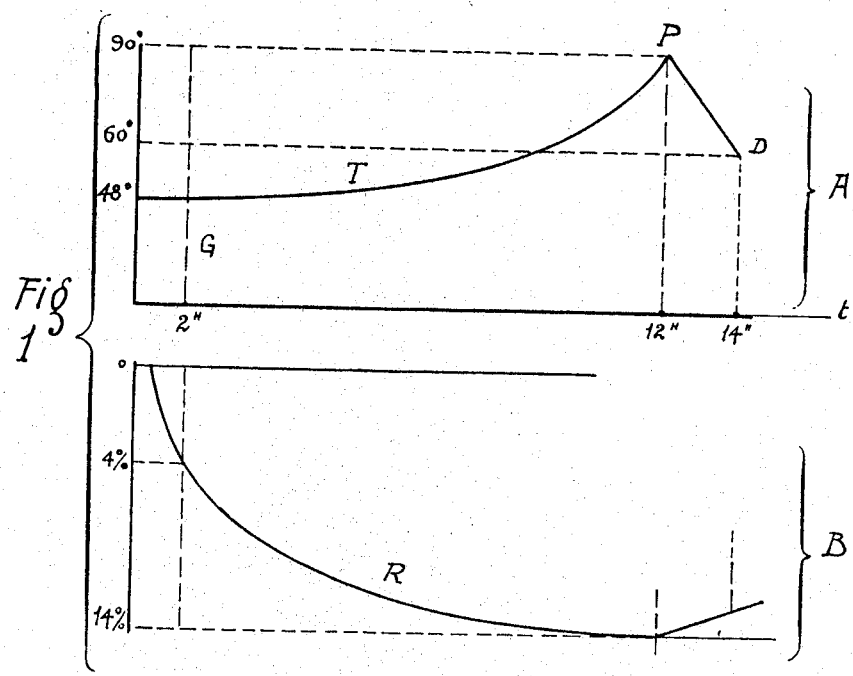
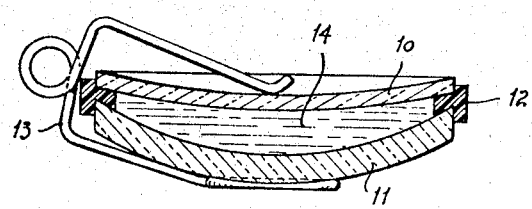
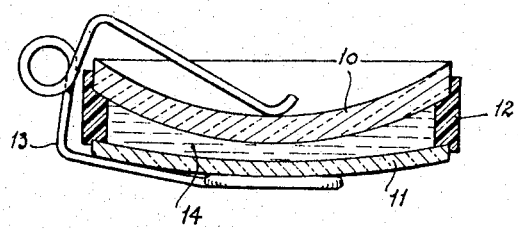
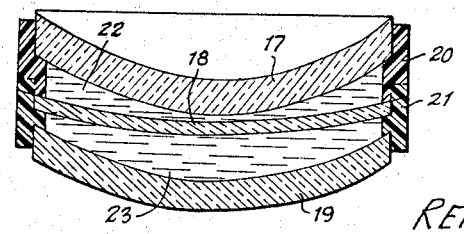
INVENTOR
RENE GRANDPERRET
By Irwin S. Thompson 3,278,654
APPARATUS AND METHOD OF PRODUCING
OPTICAL AND OPHTHALMIC LENSES FROM
THERMOSETTING RESIN MATERIALS
René Grandperret, Saint-Maur, France, assignor to Lentilles Ophtalmiques Speciales Société Anonyme, Saint-Maur, France, a corporation of France
Filed June 12, 1958, Ser. No. 741,629
Claims priority, application France, Apr. 25, 1958
764,067
7 Claims. (Cl. 264—1)

The usual procedure in producing such lenses is to pour the monomer resin into molds, usually glass molds, and then heat the filled molds to a predetermined temperature to polymerize the resin.

In practice, however, such a process is difficult to carry out successfully and a number of difficulties have to be overcome if lenses having the requisite optical characteristics are to be produced.

One difficulty arises out of the fact that suitable thermosetting resins for optical and ophthalmic lenses, such for example as allyl compounds, e.g., allyl diglycol carbonate, diallyl phthalate, allyl chloroacrylate and the like, will only polymerize if held thoroughly out of contact with atmospheric air. This condition must be fulfilled even during the period that the material undergoing polymerization is contracting.

With the types of resins used, such contraction is very substantial and may amount to as much as 15% to 20% by volume of the material, and it moreover is non-uniform as between the center and periphery of the lens due to the configuration of the lens. The contraction or shrinkage causes separation of the lens from the mold wall, thereby deforming the lens and moreover allowing air into the mold which is liable to arrest the polymerization process prior to its normal completion. The resulting lens may have to be discarded since no distortion from the prescribed contour of the lens can be tolerated for optical purposes.

A further condition required for successful performance of such processes involves the maintenance of uniform temperature throughout the mass during polymerization, and the fact that the temperature must accurately follow a prescribed, gradually increasing schedule.

Since polymerization is an exothermic reaction, it is essential that the excess temperature be dissipated rapidly and spontaneously in order to avoid local heat buildup liable to result in overheating and/or unequal temperature distribution interfering with the satisfactory progress of polymerization.

In order to ensure a permanent contact between the molds, it is found necessary to provide comparatively thick it has been suggested that a high external pressure be applied to the molds, or alternatively that yielding seals be provided which would yield to the action of atmospheric pressure. Such procedures, however, have been found unsatisfactory because of the unequal contraction between the central and peripheral areas of the lens.

In order to withstand pressure forces when using glass molds, it found necessary to provide comparatively thick mold walls. Such mold walls are relatively unyielding, so that the lens breaks away prematurely from the mold surface and is liable to fail. Moreover, a thick walled mold is an obstacle to successful dissipation of excess heat. If on the other hand the mold wall thickness is reduced it is the mold that will tend to fail under the distortion strains imposed on it.

I have discovered that the above difficulties can be successfully overcome in the production of optical and ophthalmic lenses from thermosetting resins, through the use of quenched glass molds having thin walls with parallel faces, for polymerizing the resin.

By quenched or annealed glass I intend to designate glass that has been carried to a temperature of about 700° C. and then quickly cooled to ambient temperature by a jet of air or the like. Glass treated in this way has high impact strength and moreover has the characteristic property that it will break up into non-cutting fragments. More important for the purpose of the invention, the quenching treatment also imparts to the glass increased flexibility and resiliency. Quenched glass is about five times as resilient as unquenched glass of similar type. It is this particular feature which is taken advantage of according to the invention. The thinner the glass sheet the more flexible it is. If the mold is made from elements of quenched glass having a uniform thickness on the order of 4 mm., the mold will readily follow and conform to any shrinkage variations in the material as between the center and periphery of the lens without any separation or break-away between the mold wall and the resin. Moreover, owing to its low thickness dimension such a mold wall will readily dissipate any excess heat generated during polymerization.

In order to eliminate any distortion undergone by the glass during the quenching treatment it is generally desirable to machine the quenched-glass molds in two stages. In a first stage, prior to quenching, a glass blank is made and its walls are machined to the prescribed curvature and dimensions. The blank is then quenched and again machined to remove the distortion consequent on quenching. The active surfaces of the mold are buffed and polished to their final optical dimensions and curvatures.

By the use of a mold thus produced from quenched glass elements, faultless and uniform production output can be obtained, a result that was not achievable by any of the prior art procedures.

To maintain the proper spacing between the quenched glass mold elements, according to another feature of the invention, the elements are interconnected by a plastic annular seal having a peripheral thickness dimension corresponding to the peripheral thickness of the lens, and made from a material having a softening characteristic such that it will permit of the two walls of the mold to move in towards each other by an amount at least large enough to compensate for the contraction of the thermosetting resin during polymerization.

The invention will now be described in greater detail with reference to the accompanying drawings, wherein:

FIG. 1 is a temperature chart;
FIG. 2 illustrates in cross section a mold assembly for making a positive lens;
FIG. 3 shows successive stages in the manufacture of a negative lens;
FIG. 4 is a similar view of a composite mold assembly for molding a pair of complementary lenses.

For the purposes of the ensuing exemplary description it is assumed that the lenses are made from allyl diethylene glycol-2-carbonate, known by the trade name of CR39, a thermosettable material, with addition thereto of an appropriate catalyst such as isopropyl percarbonate or benzoyl peroxide, polymerizing when slowly and gradually heated to 90° C. It should be distinctly understood however that various other thermosetting resins may be used in carrying out the invention.

FIG. 1 illustrates in the chart A, the heating cycle of the above specified allyl carbonate, and in chart B the corresponding shrinkage sustained by the material during polymerization. In both charts the abscissae are time of treatment $t$. It will be apparent that the monomer is first maintained 2 hours at a temperature of 48° C. thereby causing gelation as indicated at G, with a low contraction of about 4%. The temperature T is progressively raised, first slowly then more rapidly towards the end of the heating period, up to a final value of 90° C., thereby causing polymerization at P. The polymer is then cooled to 60° C. at which point the mold stripping operation can be performed as indicated at D.

It will be seen that during the polymerizing process the material undergoes a contraction R amounting to as much as about 14%.

In order to overcome the objectionable effects of such contraction or shrinkage, I use according to this invention a mold of the type illustrated in FIG. 2. This mold comprises a pair of mold sections 10 and 11 made of quenched glass, and if necessary, hardened and polished after quenching, the sections being interconnected by an annular seal 12 and held in position by a resilient clamping device 13.

Each element 10 or 11 has parallel faces and is about 4 mm. in thickness. That face which is to engage the lens is optically finished in accordance with conventional procedure. The seal is made from a plastic composition having a softening curve of such gradual slope as to provide ample compensation for the shrinkage of the thermosetting material occurring as indicated by the curve R.

The mold filled with thermosetting monomer resin 14 is placed in an oven and undergoes the temperature cycle according to curve T in FIG. 1. As the material polymerizes it simultaneously contracts in accordance with the curve R, and the seal 12 concurrently softens and thus allows the mold walls to move inward to compensate for the contraction of the material at the periphery of the lens. It has been found that the different amount of contraction occurring at the center of the lens is compensated for by the inherent resiliency of the element 10, which yields and deforms in such a way as at all times to ensure that contact is present between the mold walls and the lens.

After the material has polymerized and cooled (point D of the curve) the clamp 13 and the seal 12 are removed and the elements 10 and 11 are moved apart so as to strip the lens from its mold. The resulting lens 14 is ready for use.

The mold in FIG. 2 is of a type designed for molding spherical concave-convex lenses in which contraction is a minimum at the periphery adjacent the seal 12 and is a maximum at the center.

A similar arrangement is applicable to spherical convex concave lenses, i.e. negative lenses, as shown in FIG. 3, wherein the same components will be recognized including the quenched glass elements 10 and 11, seal 12 and clamp 13. With this shape of lens however, the contraction is greatest peripherally and lowest centrally of the lens. With such increased contraction it may sometimes be found difficult to maintain the requisite airtightness of the mold. A two-stage procedure may then be used.

It has been indicated above that in using a mold of the kind above described that the mold elements would deform to a different degree in accordance with their curvature. In practice however only the less highly curved portion will actually deform to a substantial extent while the remaining portions of the lens will be practically undeformed. In FIG. 2 for example the convex portion 10 of the mold will alone assume the entire deformation, and in FIG. 3 the concave portion 11 will.

One desirable embodiment of the invention relies on the above finding and comprises providing simultaneously and in a single step, two complementary lenses the one concave-convex and the other convex-concave, as shown in FIG. 4. The mold then comprises three portions 17, 18 and 19 each of uniform thickness. The lease-curved part 18 is polished to an optical finish on both faces. The three mold elements are assembled by means of a two-part seal 20 and 21 having annular interfitting surfaces. The seal is made from a composition adapted to soften in proportion to the contraction of the thermosetting material. With such a three part mold two lenses 22 and 23 are produced in a single molding step, whereas producing the two lenses separately would require four mold elements. Thus a saving in labor and in tooling is simultaneously effected.

What I claim is:

1. In the manufacture of optical lenses of synthetic resin thermosetting by polymerization in a mold, the improvement which consists in simultaneously polymerizing two lenses having respectively two surfaces having the same curvature, concave in the case of one of the lenses and convex in the case of the other, in a mold of three superposed parts of glass having uniform thickness, aligning two of said parts in parallel relationship, interposing the third central part having a curvature which is common to the two lenses to be polymerized between the two said parts, joining said parts together in pairs by means of thermoplastic joints, and arranging the parts of the mold to compensate for the contraction of the resin.

2. A method of producing optical and ophthalmic lenses from thermosetting synthetic resin, which comprises simultaneously introducing said resin into two complementary spaces in a mold consisting of three parts of quenched glass having uniform thickness with two of said parts being similar and aligned in parallel relation while the third of said parts is interposed between said two parts, said parts being of sufficient flexibility to compensate for the contraction of said resin, sealing the adjacent parts of the mold with thermoplastic seals, said seals capable of softening to compensate for the contraction of said resin, and solidifying the synthetic resin by heating.

3. A mold for the simultaneous manufacture of two complementary optical lenses of synthetic thermosetting resin by polymerization, comprising a pair of tempered glass plates having a uniform thickness, the same curvature, and arranged in parallel relationship, a third tempered glass plate interposed between asid pair of plates of uniform thickness, said glass plates having sufficient flexibility to compensate for the shrinkage variations of said resin during its setting, and thermoplastic joints supporting said glass plates in pairs, said joints being capable of softening under heat so as to compensate for the shrinkage of the resin during its setting.

4. A mold for casting an ophthalmic lens of non-uniform thickness and opposed sides of which have different curvatures from thermosetting plastic which shrinks considerably during polymerization, said mold comprising axially spaced first and second hardened glass mold parts, a continuous resilient sealing gasket peripherally disposed around said mold parts and forming with internally projecting shoulders against which said glass mold parts abut, said mold parts and sealing gasket defining a lens molding cavity adapted to retain a quantity of thermosetting plastic therein, both said mold parts having differently curved working surfaces polished smooth whereby corresponding contours and smoothness are imparted to the lens element, at least one of said glass mold parts being relatively flexible and adapted to yield and deform with the plastic during polymerization thereby accommodating differential shrinkage of the lens element caused by the non-uniform thickness thereof and thereby ensuring contact between the mold parts and lens throughout polymerization.

5. A mold for casting transparent thermosetting plastic ophthalmic lens blanks having the opposed sides thereof formed with different curvatures whereby the thickness of the blanks is nonuniform and which thermosetting plastic shrinks considerably during polymerization, said mold comprising a first and a second axially spaced hardened glass mold part, the relatively thick first glass mold part being substantially thicker and being substantially more rigid than the second mold part, the relatively flexible second mold part being relatively flexible across the lens blank to accommodate differential shrinkage of the lens blank, a continuous resilient sealing gasket peripherally disposed around said glass mold parts and formed with an internally projecting shoulder against which said glass mold parts abut, said glass mold parts and sealing gasket being effective to retain a quantity of thermosetting plastic therebetween during polymerization of the plastic, differently curved working surfaces on said mold parts ground and polished smooth so as to be substantially free of scratches, digs, waves and grayness for imparting corresponding contours and smoothness to the polymerized thermosetting plastic lens blank, the thermosetting plastic shrinking during polymerization by a proportionately greater amount in those portions of the mold where the plastic is thicker, and said flexible glass mold part flexing with said plastic during polymerization and thereby accommodating differential shrinkage of the lens blank due to the nonuniform thickness thereof and thereby allowing the plastic to adhere to both glass mold parts throughout polymerization.

6. A mold in accordance with claim 5 wherein the plastic ophthalmic lens blanks formed thereby are thicker at the periphery than in the center thereof.

7. A mold in accordance with claim 5 wherein the plastic ophthalmic lens blanks formed thereby are thicker in the center than in the peripheral regions thereof.

References Cited by the Examiner

UNITED STATES PATENTS

| | | | |
|---|---|---|---|
| 2,370,562 | 2/1945 | Meunier | 18—58 XR |
| 2,379,248 | 6/1945 | Muskat | 18—58 XR |
| 2,390,129 | 12/1945 | Shobert | 18—58 XR |
| 2,542,386 | 2/1951 | Beattie. | |
| 2,687,555 | 8/1954 | Anspon et al. | 18—58 XR |
| 2,728,106 | 12/1955 | Herman et al. | |
| 2,745,138 | 5/1956 | Beattie | 18—58 XR |
| 2,848,753 | 8/1958 | Anspon et al. | 18—58 |
| 2,911,682 | 11/1959 | Ewald. | |

OTHER REFERENCES

Glass Manual: 1946; Pittsburgh Plate Glass Co.; TP860P69gc.4 pp. A–2.14 and J–1.4.

J. SPENCER OVERHOLSER, *Primary Examiner.*

ALEXANDER H. BRODMERKEL, MICHAEL V. BRINDISI, *Examiners.*

S. NEIMARK, L. D. RUTLEDGE, J. H. FLINT,
*Assistant Examiners.*